United States Patent [19]
Strobel et al.

[11] 3,986,571
[45] Oct. 19, 1976

[54] LOAD-COMPENSATING WEIGHING APPARATUS INCLUDING SIGNAL MODIFYING MEANS

[76] Inventors: Felix Strobel, Am Pfisterholzli 26, CH-8606 Greifensee; Peter Kunz, Heligeichstrasse 32, CH-8630 Tann-Ruti, both of Switzerland

[22] Filed: Oct. 28, 1975

[21] Appl. No.: 626,198

[30] Foreign Application Priority Data
Dec. 6, 1974 Switzerland.................. 16224/74

[52] U.S. Cl................................ 177/185; 177/210
[51] Int. Cl.²...................................... G01G 23/10
[58] Field of Search............ 177/210, 185; 328/171, 328/169, 215

[56] References Cited
UNITED STATES PATENTS

| | | | |
|---|---|---|---|
| 2,914,310 | 11/1959 | Bahrs................... | 177/210 |
| 3,133,606 | 5/1964 | Thomson............ | 177/210 |
| 3,172,493 | 3/1965 | Koch et al........... | 177/210 |

*Primary Examiner*—Joseph W. Hartary
*Attorney, Agent, or Firm*—Lawrence E. Laubscher

[57] ABSTRACT

Weighing apparatus of the return-to-zero load compensation type is disclosed, characterized by the provision of voltage-responsive impedance means for modifying the pan position sensing signal to remove undesirable variations therein produced by interference or external vibrations or excessive swinging of the weighing pan by the load. In one embodiment, a dampening circuit is connected between the pan position sensing circuit and the control signal generating means for dampening sensing signals having an amplitude less than a given limit amplitude. In a second embodiment, the voltage-responsive means serves to render inoperable the differential section of a proportional-differential-integral controller when the pan position sensing signals are less than a given limit amplitude. In both embodiments, the voltage-responsive impedance means comprises a pair of diodes connected in polarity opposition in parallel in the corresponding signal-modifying circuit.

6 Claims, 6 Drawing Figures

LOAD-COMPENSATING WEIGHING APPARATUS INCLUDING SIGNAL MODIFYING MEANS

BRIEF DESCRIPTION OF THE PRIOR ART

As evidenced by the prior U.S. patents to Baumann et al. No. 3,816,156, Allenspach U.S. Pat. No. 3,786,884, Strobel U.S. Pat. No. 3,688,854, Strobel et al. U.S. Pat. No. 3,789,937 and Kunz U.S. Pat. Nos. 3,786,678 and 3,786,883, it is known in the prior art to provide weighing apparatus of the return-to-zero electromagnetic compensation type wherein means are operable when the pan is displaced from a zero position by a load for supplying a current which produces in a magnetic field a force for returning the loaded pan to its zero position, the magnitude of the current being a measure of the applied load. Position sensing means serve to generate a pan position signal that is applied to a control curcuit that provides an appropriate pan return current which is applied to the compensation means.

One inherent problem in such known weighing apparatus is that of reducing, and, if possible, eliminating, the influence of external vibrations on the weighing apparatus, more particularly on the result output. The significance of this problem increases as the resolution of the apparatus rises.

SUMMARY OF THE INVENTION

According to the present invention, there is provided a weighing apparatus comprising an electromagnetic compensation means operable to counteract the weight to be measured, by means of a compensation current, and a control circuit for determining the magnitude of the compensation current, the control circuit including: a position detector for producing a signal indicative of the operating position of the apparatus; a control means for receiving a said signal and operable thereby to determine the magnitude of the compensation current required to compensate said weight; and a signal-modifying circuit operatively associated with the input of the control means and including a voltage-dependent impedance means having a severely curved characteristic, such that the control performance of the control circuit is modified in dependence on the amplitude of said signal.

Accordingly, the primary object of the present invention is to provide an improved weighing apparatus of the return-to-zero electromagnetic compensation type, including voltage-responsive impedance means for modifying the pan position signal to eliminate variations therein caused by external vibrations, excessive pan swinging or the like. In a first embodiment of the invention, a dampening circuit containing the voltage-responsive impedance means is connected between the pan position sensing means and the control means which generates the pan return signal, said dampening circuit serving to strongly damp the pan position signals (either of low or high frequencies) having an amplitude less than a given value. In a second embodiment, the voltage-responsive impedance means are connected as part of the PID-controller (i.e., the proportional-integral-differential controller) which generates the pan return signal, said voltage-responsive impedance means being operable to render inactive the differential section of the PID-controller when the amplitude of the pan position signals is less than a given value. Thus, the signal-modifying circuit is a threshold means which is connected upstream of the D-component of the control means and which imparts a PI-performance to the control means below a limit amplitude of the signal from the zero position detector. In this case, the performance of the control means itself is altered in dependence on the amplitude of the input signal. Thus, the rapid response to signals of low amplitude, caused by the D-component of the control means, is prevented. The performance of the PI-part of the control means and the desired (high) amplifications of the entire control circuit are maintained. Very low-frequency interference signals pass into the control signal, corresponding to the performance of the PI-component, that is to say, the modification in the control characteristic only occurs in respect of higher frequencies.

In accordance with a more specific object of the invention, the voltage-responsive impedance means comprises a pair of diodes connected in opposite polarity in parallel, thereby providing an economical arrangement.

BRIEF DESCRIPTION OF THE DRAWING

Other objects and advantages of the invention will become apparent from a study of the following specification when viewed in the light of the accompanying drawing, in which.

DETAILED DESCRIPTION

For the purposes of describing the apparatus, reference will be made to an embodiment in the form of a top-pan balance without balance beam. It is to be understood however that the apparatus can be in the form of other kinds of weighing equipment, for example, apparatus with a balance beam.

Figure 1A:
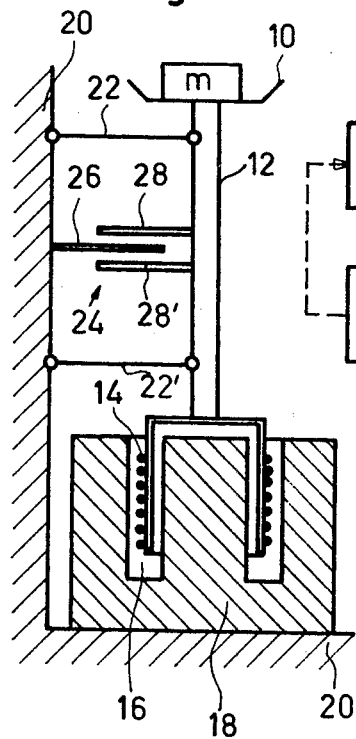
FIGS. 1a and 1b are diagrammatic and block diagram representations, respectively, of a first embodiment of the invention.

As shown in FIG. 1a, the balance has a weighing pan 10 for receiving an article or material m to be weighed. The weighing pan 10 is fixed to the upper end of a pan carrier 12, while a movable coil 14 is secured to the lower end of the pan carrier 12. The coil 14 is movable in an annular air gap 16 in a pot-shaped permanent magnet 18 which is fixed in the balance frame 20. The pan carrier 12 is guided parallel to itself by means of two guide arms 22 and 22' which are supported on the balance frame 20, so that in a weighing operation the pan carrier 12 performs substantially only a vertical movement.

Disposed between the two arms 22 and 22' is a zero position detector 24 which includes a stationary capacitor plate 26 secured to the balance frame 20 and two further capacitor plates 28 and 28' which are disposed on respective sides of and adjacent to the capacitor plate 26 and which are both carried on the pan carrier 12.

Figure 1B:
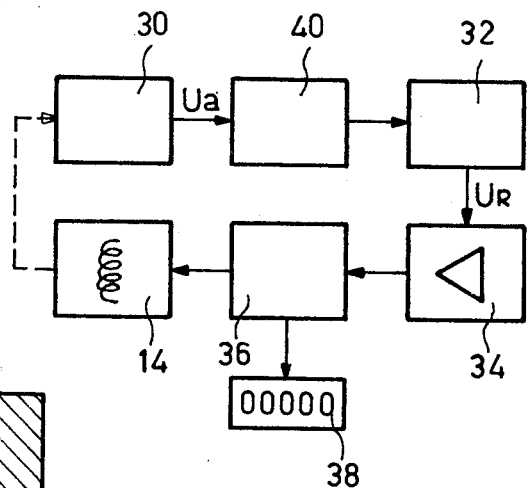

FIG. 1b shows the control circuit of the apparatus. When the pan carrier 12 is displaced out of a zero position in which, for example, the plates 28 and 28' are equally spaced from the fixed plate 26, the zero position detector 24 operates as a differential capacitor to generate in a known manner, by means of a sensing unit 30 (usually an alternating current bridge with rectification of the output signal), an error or pan position signal U$a$ which is supplied to a control means 32 in which the signal is processed to determine the magnitude of a correction or compensation current. The correction or compensation current signal U$r$ is amplified in an amplifier 34, and the amplified current signal is supplied to the coil 14. Due to its electromagnetic force action in the air gap 16 of the permanent magnet 18, the correction or compensation current attempts to counteract the force, i.e., the weight of material $m$, which is deflecting the pan carrier 12. When the balance is in the "swung-in" or equilibrium condition and the pan carrier 12 is at least substantially stationary, the compensation current represents a measurement of the weight of the material $m$ being weighed. This measurement can then be processed by an evaluation circuit 36 and passed to a display means 38 (and possibly recorded by way of a further output). The circuit 36 can include, in a manner which is also known, a digital voltmeter to measure a voltage which is produced by the compensation current at a high-precision measuring resistor and which is proportional to the weight of the material $m$.

As indicated by the broken-line arrow connecting the units 14 and 30, denoting the operative connection between the mechanical part of the balance (at the left in FIG. 1; zero position detector 26, 28 and 28'), and the unit 30 the system described above forms what is virtually a closed control circuit, including the mechanical part of the balance. In order to substantially reduce the effect of external vibrations or accelerations on the control circuit (and thus on the display means 38), a damping circuit 40 is connected into the system, between the sensing unit 30 and the control means 32. This circuit 40, as shown in greater detail in FIG. 2, includes a parallel circuit of a resistor 42 and two diodes 44 and 44' arranged with opposed directions of conduction. This parallel circuit is arranged in series with a resistor 46. This circuit portion 46, 42, 44 and 44' operates as follows: as long as the diodes 44 and 44' are in the nonconducting condition, error signal U$a$ supplied from the sensing unit 30 is modified in accordance with the relationship of the resistor 50 to the sum of the resistors 42 and 46, and passed to the control means 32, as a correspondingly smaller signal U$i$. If for example the resistors 42 and 46 are in a relationship such as 9:1, the value of U$i$ will be only one tenth of the value of U$a$ (if the resistor 50, which is described in greater detail hereinafter, is correspondingly selected). If on the other hand, the amplitude of the error signal U$a$ is so great that the diodes are put into a conducting condition (for example while the balance is swinging into the equilibrium condition after having been loaded with material $m$ to be weighed), then the resistors 42 and 46 do not substantially affect the error signal, and the error signal reaches the control means 32 virtually unaltered (U$a$ = U$i$). The connection is qualitatively shown in FIG. 3; to the right of the dotted line, U$i$/U$a$ is about 1, that is to say, the error signal reaches the control means 32 virtually without alteration.

Therefore, by suitable selection of the diode characteristics, it is possible to determine for the error signal U$a$ a limit amplitude below which the signal is strongly damped, depending on the size of the resistors 42 and 46, which can also be substantially freely selected. Thus the sensitivity of the system in regard to interference vibrations of low amplitude, irrespective of their frequency, can be substantially improved, that is to say, the result display can be stabilized. The choice of the limit amplitude substantially depends on two criteria: on the one hand, it is necessary to ensure that the control means remains stable, that is to say, does not go into a state of oscillation, and on the other hand the time that the balance takes to swing into an equilibrium condition after changes in load should not be rendered excessive.

The diodes 44 and 44' are preferably used for reasons of economy and because of their favourable characteristics. However, instead of the diodes, it would also be possible to use any other suitable components with a severely curved conduction characteristic (for example, Zener diodes), which provide a performance similar to that shown in the FIG. 3 graph.

Figure 2:
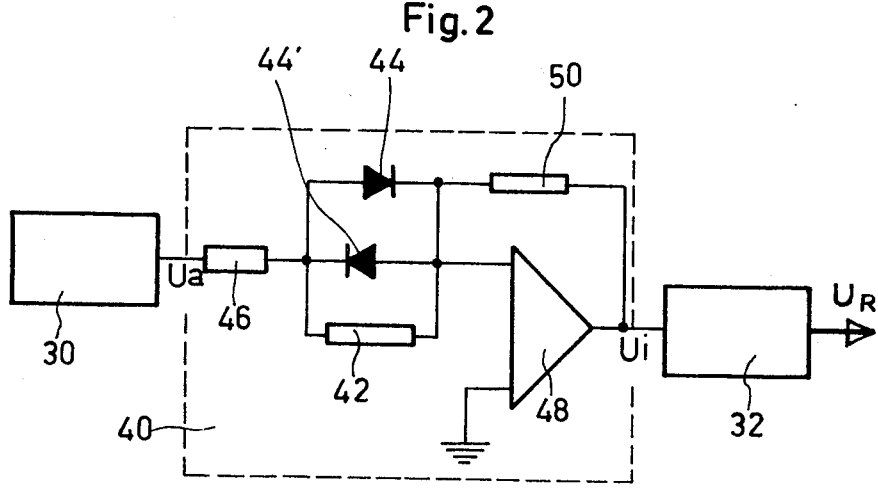
FIG. 2 is a detailed electrical schematic diagram of the dampening means of FIG. 1b.
Figure 3:
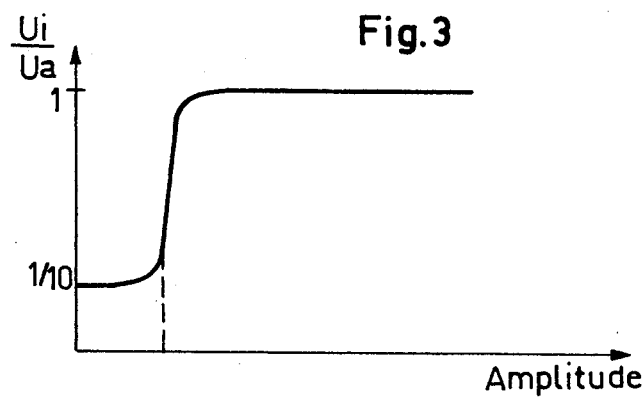
FIG. 3 is a graph illustrating the operation of the dampening means of FIG. 2 relative to voltage magnitude.

Reverting briefly to FIG. 2, an amplifier 48 and the resistor 50 connected in parallel therewith (in the above-described example the resistor 50 has the same value as the resistor 46) are provided for adaptation of the unit 40 to the input impedance of the control means 32.

Figure 4:
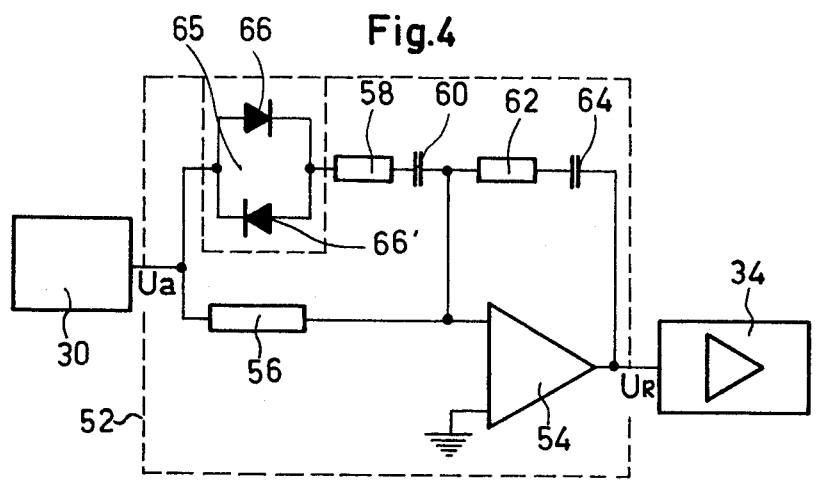
FIG. 4 is a detailed schematic diagram of a second embodiment of the invention.
Figure 5:
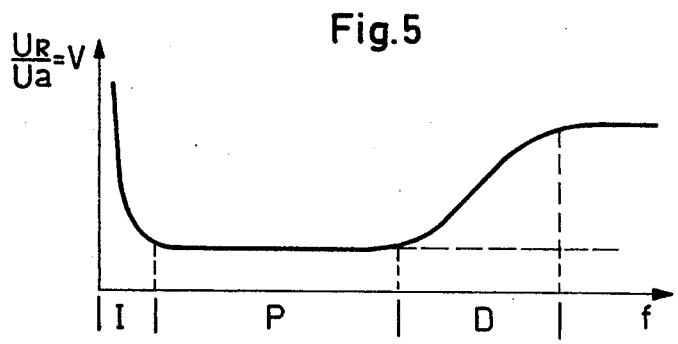
FIG. 5 is a graph illustrating the operation of the embodiment of FIG. 4.

While in the above-described example the control means 32 can basically be of any suitable structure, the second embodiment as shown in FIG. 4 requires a control means in the form of a PID-controller 52 (i.e., a proportional-integral-differential controller). The controller includes, and is known to this extent, a control amplifier 54 and a resistor 56 which is connected to one input of the amplifier 54 and which with a resistor 62 defines the P-component of the controller. Connected in parallel with the resistor 56 is an RC-member (resistor 58 and capacitor 60) which with the resistor 62 determines the performance of the D-component. Finally, connected in parallel with the amplifier 54 is a capacitor 64 which with the resistor 56 determines the performance of the I-component of the controller. The amplification characteristic of such a controller corresponds to the solid line characteristic curve in FIG. 5 (amplification V [= control signal U$R$ with respect to the error signal U$a$] over the frequency $f$); that is to say, the extent of the amplification action is only dependent on the frequency of the error signal, but not its amplitude, so that even small interference amplitudes are also amplified, in particular those below and above a middle frequency range which corresponds to the P-component control range.

In accordance with the present invention, another amplification is provided for the controller 52, above the above-mentioned middle frequency range, for small amplitudes. This is effected, similarly as in the above-described first embodiment, by means of a circuit or component 65 having a highly non-linear, voltage-dependent resistance, for example two diodes 66 and 66' arranged in parallel with each other and with opposed directions of conduction, connected in series with the D-component (58, 60, 62) of the controller. These diodes 66 and 66' provide that the controller has a purely PI-performance in respect of small interference amplitudes (that is, when the diodes 66 and 66' are in the non-conducting condition), and therefore virtually suppresses such amplitudes, while at greater amplitudes (when the diodes 66 and 66' are in conducting condition), the controller operates normally as a PID-controller. The horizontal broken line in FIG. 5 in the D-region illustrates the amplification performance of the controller 52 if the D-component is rendered passive as described above (diodes 66 and 66' nonconducting). It can be seen from this that higher-frequency interference signals of low amplitude only have a small effect on the control signal U$r$ (low-frequency interference signals of low amplitude play a part which in practice is less important). This arrangement can therefore also cause the display output of the apparatus to be substantially stabilized.

Based on the experience that the externally originating vibrations which occur most frequently are of relatively low amplitudes (at predominantly relatively high frequencies), in the above-described apparatus, it is possible for the multiplicity of interference vibrations which occur in practice and which act from the outside on the weighing apparatus, to be so reduced that weighing performance may no longer be influenced by such vibrations, and in particular the result display remains steady, without the measuring result being falsified.

Experiments have shown that balances in accordance with the two embodiments described above could provide a stability that was improved by about a factor of 10, in comparison with conventional balances, under otherwise equal ambient conditions, with only a slight extension in the swing-in time of the control circuit, and with the same standard of accuracy.

While in accordance with the provisions of the Patent Statutes, the preferred forms and embodiments of the invention have been illustrated and described, it will be apparent to those skilled in the art that various changes may be made without deviating from the inventive concepts set forth above.

What is claimed is:

1. In a weighing apparatus of the return-to-zero load compensating type including a support (20); a weighing pan (10) normally having a given zero position relative to said support; means operable when the pan is displaced from the zero position by the application of a load thereto for returning the pan to its zero position, comprising pan sensing means (30) for generating a position signal (U$a$) which is a function of the degree of displacement of the pan from its zero position, control signal generating means (32, 52) responsive to said position signal for generating a pan return signal (UR), and pan return means (14, 16) operable by said pan return signal for returning the pan to its zero position; and indicating means (36, 38) responsive to said pan return signal for providing an indication that is a function of the magnitude of the load applied to the pan; the improvement which comprises threshold circuit means including voltage-responsive impedance means having a severely curved voltage characteristic connected between said pan sensing means and said pan return means for modifying those pan position signals (U$a$) having an amplitude less than a given amplitude, thereby to reduce the effect of external interference vibrations and accelerations on the control means and to increase the stability of the indication presented by said indicating means.

2. Apparatus as defined in claim 1, wherein said threshold circuit means comprises an amplitude-responsive dampening circuit (40) connected between said position sensing means (30) and said control means (32).

3. Apparatus as defined in claim 2, wherein said dampening circuit means includes
   a. input and output terminals connected with said position sensing means and with said control means, respectively;
   b. a first resistor (46) connected at one end with said input terminal;
   c. an amplifier (48) having an output terminal connected with the output terminal of said damping means, said amplifier having at least one input terminal;
   d. a second resistor (42) connected between the other end of said first resistor and said one amplifier input terminal, said second resistor having a substantially greater resistance value than said first resistor; and
   e. a third resistor (50) connected with said amplifier input and output terminals in parallel across said amplifier;
   f. said voltage-responsive impedance means comprising a pair of diodes (44, 44') connected in opposite polarity relation in parallel across said second resistor.

4. Apparatus as defined in claim 3 wherein said first and third resistors have substantially the same resistance value.

5. Apparatus as defined in claim 1, wherein said control means includes proportional, differential and integral components, and further wherein said differential components are rendered inoperable when the amplitude of the position signal is less than a predetermined limit, whereby the controller is imparted with only proportional and integral performance.

6. Apparatus as defined in claim 5, wherein said control means includes
   a. input and output terminals connected with said sensing means and with siad pan return means, respectively;
   b. an amplifier (54) having an output terminal connected with said control means output terminal, and at least one input terminal;
   c. a first resistor (56) connected between said control means input terminal and said amplifier input terminal;
   d. a second resistor (62) and a first capacitor (64) connected in series in a first branch connected in parallel across said amplifier input and output terminals; and
   e. a third resistor (58) and a second capacitor (60) connected in series in a second branch connected at one end with said amplifier input terminal;
   f. said voltage-responsive impedance means comprising a pair of diodes (66, 66') connected in opposite polarity relation in parallel between the other end of said second branch and said control means input terminal.

* * * * *